United States Patent
Halstead

(10) Patent No.: US 6,772,932 B1
(45) Date of Patent: Aug. 10, 2004

(54) AUTOMATED WELDING SYSTEM UTILIZING OVERHEAD ROBOTS

(76) Inventor: Scott P. Halstead, 3619 Shadyridge, Jackson, MI (US) 49201

( * ) Notice: Subject to any disclaimer, the term of this patent is extended or adjusted under 35 U.S.C. 154(b) by 0 days.

(21) Appl. No.: 10/303,358

(22) Filed: Nov. 25, 2002

(51) Int. Cl.$^7$ .............................. B23K 9/00; B23K 37/02
(52) U.S. Cl. ......................... 228/45; 219/125.1; 901/42
(58) Field of Search ...................... 219/125.1; 901/42; 228/45

(56) References Cited

U.S. PATENT DOCUMENTS

| | | | |
|---|---|---|---|
| 3,300,618 A | * | 1/1967 | Sciaky .................. 219/121.23 |
| 3,775,586 A | * | 11/1973 | Flint et al. ............. 219/121.63 |
| 4,695,027 A | | 9/1987 | Lindholm et al. |
| 4,719,328 A | * | 1/1988 | Yanagisawa et al. ......... 219/79 |
| 4,922,435 A | | 5/1990 | Cahlander et al. |
| 5,015,821 A | * | 5/1991 | Sartorio et al. ........ 219/124.34 |
| 6,133,545 A | * | 10/2000 | Okazaki et al. ........ 219/124.34 |
| 6,271,500 B1 | * | 8/2001 | Hirayama et al. ..... 219/130.01 |
| 6,274,839 B1 | | 8/2001 | Stone et al. |
| 6,276,284 B1 | | 8/2001 | Remley et al. |
| 6,314,686 B1 | * | 11/2001 | Scherer et al. ............... 52/36.1 |
| 6,339,204 B1 | | 1/2002 | Kato et al. |

OTHER PUBLICATIONS

US2002/0139780 A1 Jones et al. (Oct. 3, 2002—10/095,529 filed Mar. 13, 2002).*

* cited by examiner

Primary Examiner—Kiley Stoner
Assistant Examiner—Kevin P. Kerns
(74) Attorney, Agent, or Firm—Young & Basile, P.C.

(57) ABSTRACT

An automated welding system utilizing integrally mounted robots within a self-contained and repositionable work station. One or more work tables are shuttled between loading and welding stations. The robot is mounted directly adjacent the operating stage, thereby drastically reducing the required floor space. The robot arm is designed to be programed to replicate a desired welding operation in an automated fashion.

6 Claims, 5 Drawing Sheets

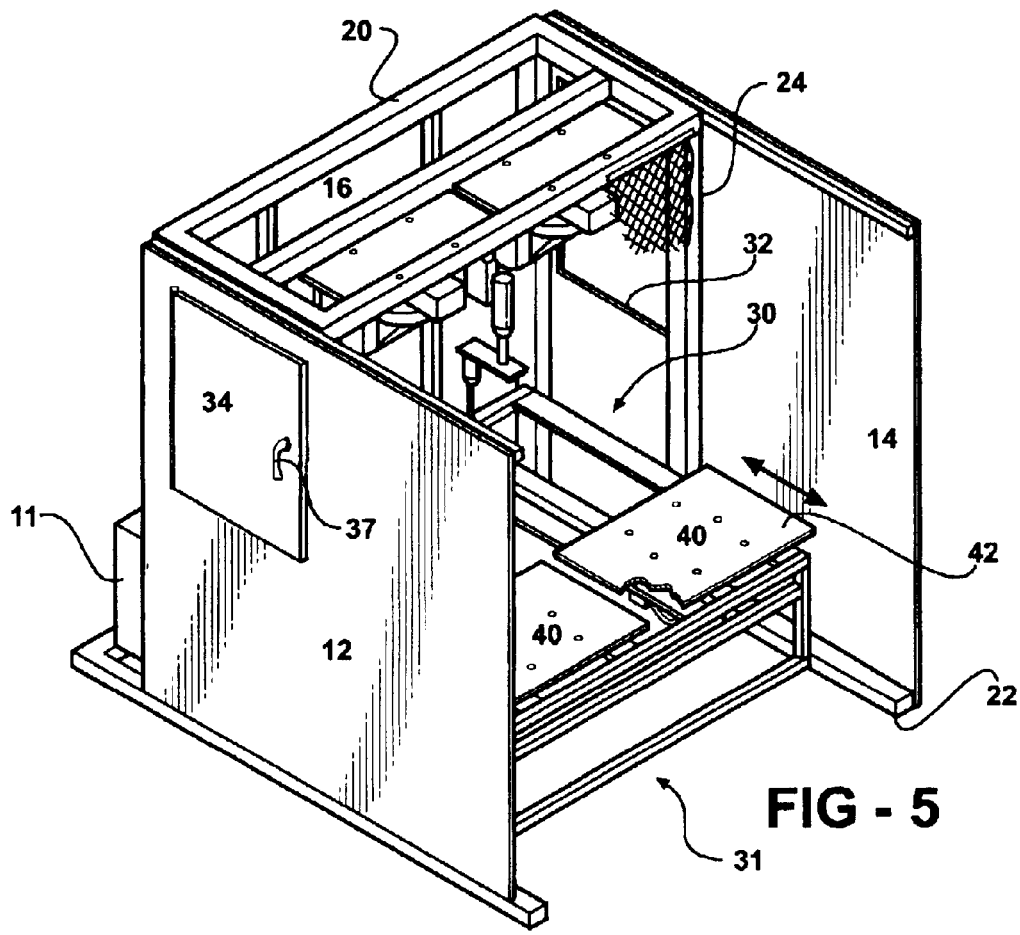
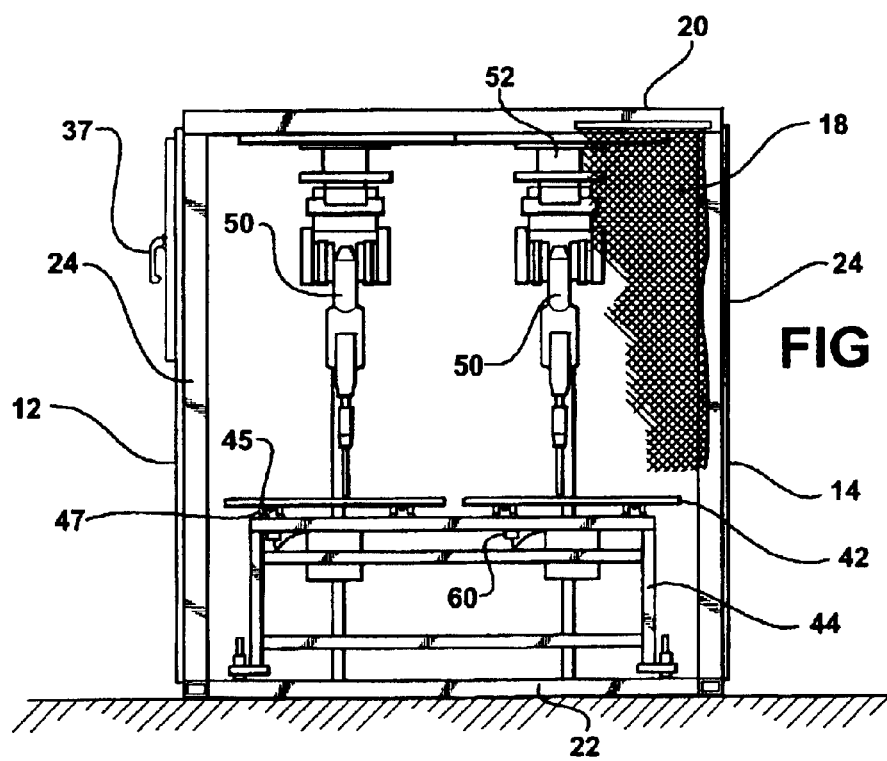

AUTOMATED WELDING SYSTEM UTILIZING OVERHEAD ROBOTS

FIELD OF THE INVENTION

The invention pertains to automated robotic welding systems, and more particularly, to self-contained welding stations.

BACKGROUND OF THE INVENTION

Dedicated work areas, frequently referred to as "work cells" or "work stations" are well known in the industrial arts. Particularly in the area of welding, the use of such work cells or work stations is common, because of the benefits associated with the strict enclosure of the welding operation, and isolation of the welding operation from the surrounding industrial environment.

Work cells or work stations equipped with robots are also well known. See, for example, U.S. Pat. No. 4,695,027, issued to Lindholm, and U.S. Pat. No. 6,274,839 B1, issued to Stone.

One of the drawbacks associated with prior art welding stations, in particular, has been the necessity for secure mounting of the robot head in relation to the workpiece to be welded. Conventional wisdom teaches that the robot head must be securely mounted to the factory floor, or to the base of the work cell or work station. While overhead mounted robots have been successfully used in certain applications, such as that taught by Cahlander in U.S. Pat. No. 4,922,435, there remains a need for a self-contained welding-type work station wherein the robotic head is mounted integrally to the work station and above the stage within the station where the welding operation will take place. This methodology provides the benefit of creating a unitary and transportable work station which is compact, preserving precious industrial floor space, yet still allowing the entire assembly to be positioned, installed, and if necessary, relocated within the industrial environment.

SUMMARY OF THE INVENTION

The invention is an automated welding system utilizing overhead mounted robots within a self-contained and repositionable work station. The invention utilizes a "shuttle" work table system, which includes one or more tables which shuttle to and from a position adjacent to the operating elements associated with the robotic arm. The invention incorporates overhead mounting of the robot directly over the operating stage, thereby drastically reducing the required floor space. The application can be used with either single or multiple robotic arm assemblies.

Further, the invention incorporates a structure forming an enclosure and supporting a robotic arm assembly. The robotic arm assembly is designed to operate within an operating stage served by one or more shuttling tables. An automated welding operation takes place within the confines of the enclosure, which protects the surrounding area from the byproducts of welding, protects nearby workers from those byproducts, and encloses the potentially dangerous light emissions from the welding process.

The welding equipment itself may be any of the conventional arc, MIG, TIG, or other common welding techniques readily adaptable to robotic tools.

The work station is built upon a sturdy perimeter frame comprised of one or more elements, including a ceiling frame, a floor frame and side wall frames. Side wall frames are provided with covers which form the enclosure. The covers themselves may be equipped with one or more openings, likewise provided with shutters. Mounted to the outside of the enclosure are one or more power supplies and one or more enclosures for operating elements such as motors, sensors, controllers, computers and the like The welding robotic arm assembly is conventional in all respects, and may have either fixed or movable track mounting. Likewise, the robotic arm assembly may utilize a turntable mounting, including a base rotor assembly which is positionable using a drive system and having appropriate feedback means, typically utilizing stepper motors. The robot arm has one or more articulating joints for selective positioning of the robot arm in all three axes within the enclosure, as well as rotating joint elements. The end of the robot arm is provided with a welding tool appropriate to the welding task to be performed. Utilizing the positioning features above described, the robot arm can be positioned in any predetermined location about the operating stage.

The shuttle tables are provided with bearing surfaces to accommodate sliding table elements. The sliding elements have a top, bottom, side and ends and are positionable on the bearing surfaces by appropriate drive means having associated feedback means.

In operation, one or more work pieces are positioned in predetermined locations on one or more work tables. Work tables are automatically positioned utilizing the aforedescribed drive means to the operating stage. Program logic or machine vision software, or both, provide instructions to the robot for correct positioning of the robot operating elements in relation to the workpiece and performing of the welding operations.

DETAILED DESCRIPTION OF THE DRAWINGS

FIG. 5 is a perspective view of the invention embodiment with dual work tables and dual robots.

FIG. 6 is a front view of the invention embodiment with dual work tables and dual robots.

DETAILED DESCRIPTION OF THE EMBODIMENT

Figure 1:
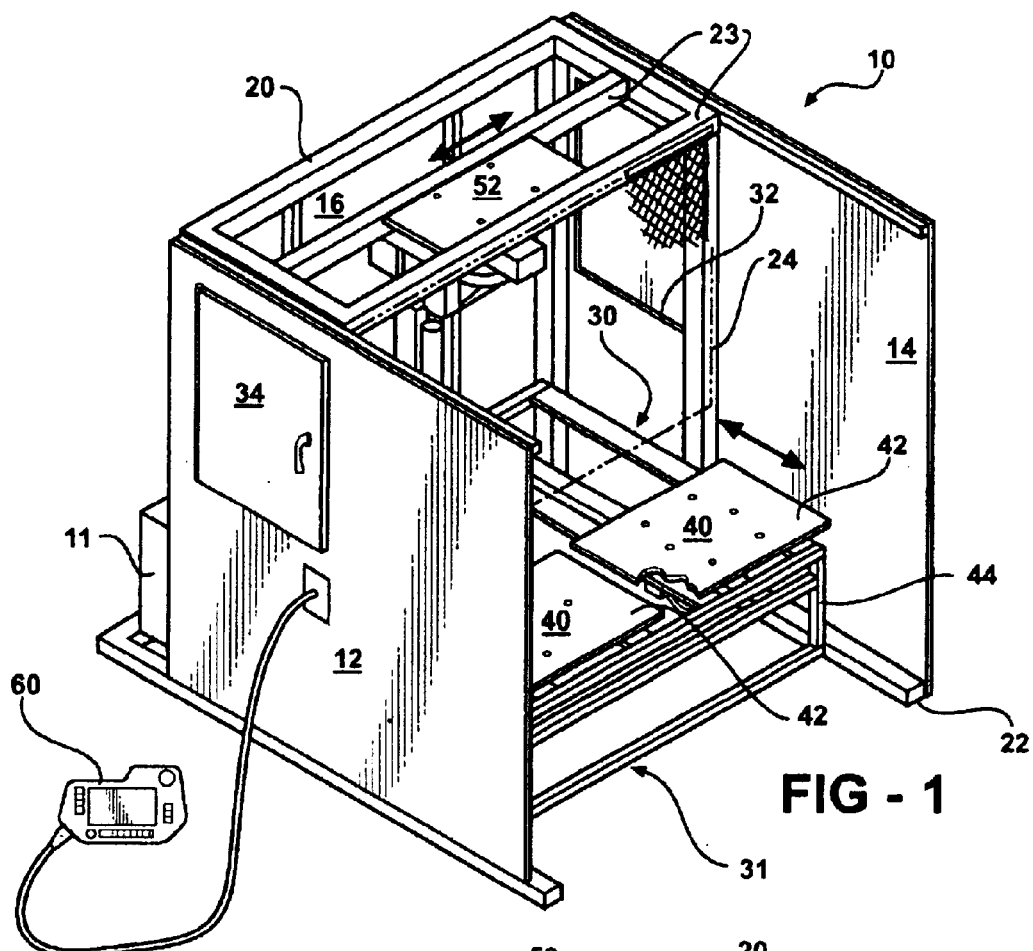
FIG. 1 is a perspective view of the work station according to the present invention showing the basic relationship of the side walls, frame work and operating and loading stations.
Figure 2:
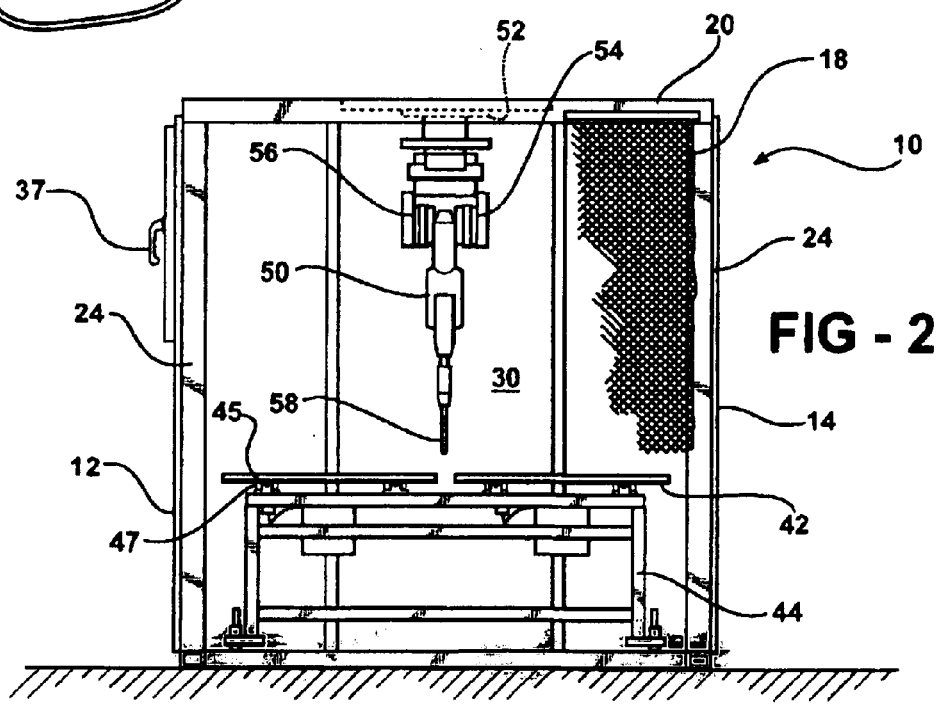
FIG. 2 is a front view of the invention showing a single robot.

An understanding of the structure and operation of the invention will be apparent from the following description, and reference to FIG. 1–10. The invention is a welding station 10 enclosing an enclosed work space 30. The enclosure typically comprises a left side wall 12, a right side wall 14, a rear side wall 16, a top frame 20 and a bottom frame 22. In one embodiment, the enclosed work space is further defined by a welding curtain 18. Side walls 12, 14 and 16 are typically constructed around one or more side frame elements 24. The side walls 12, 14 and 16 are preferably metal, for example, steel or aluminum and are designed to enclose the work space 30 and to contain the byproducts of the welding operation, as well as protect workers in the immediate area from the potentially dangerous electrical or gas energy associated with the welding process, and protect workers from the equally dangerous high intensity light generated by the welding process. Side walls 12, 14 and 16 are attached to the top frame 20 and bottom frame 22 and side frames 24 using conventional fasteners in a well known manner, thereby creating a sturdy enclosure surrounding an enclosed work space 30 and a semi-enclosed loading area 31.

Side walls 12, 14 and 16 are preferably provided with windows 32 to allow access to the work space 30 when the welding operation is not in progress. This access may include access for maintenance to the components internal to the workspace, for inspection of the results of the welding operation, repositioning of workpieces upon which the welding operation is being performed, maintenance of other components within the welding station 10 and programming of the robot 50. Windows 32 are provided with shutters 34 which are typically mounted utilizing shutter hinges (not shown), although shutters 34 may likewise be mounted on tracks or guides to permit shutters 34 to be opened and closed in relation to windows 32 in areas where clearance for opening the shutters 34 is limited. Shutters 34 are provided with latches 37 to secure the shutters in a closed position prior to the welding operation. Additionally, shutters 34 are provided with interlock sensors (not shown) which provide an electrical signal corresponding to the condition of the shutter. In this fashion, an electrical signal confirming that the shutter is in the closed position is available for a controlling device, for example, a computer, to prevent operation of the welding robot itself when any of the shutters 34 are in the opened position.

Located within the welding station 10 and suspended from the top frame 20 is a robot assembly 50.

The welding station 10 is typically used for fabrication of complex assemblies from individual components in the form of workpieces. Workpieces are placed on and frequently secured to a work surface 40, the upper surface of a movable table 42 slidably supported on a table frame 44. Table frame 44 is provided with guiding carriages 47 which engage rails 45, thereby allowing tables 42 to be moved in relation to table frame 44 from a position in the loading position 31 to the operating position 33. Tables 42 are typically driven by either electrical or pneumatic means, and their position reported by the sensors associated with the guide carriages 47 and rails 45. Utilizing this method, the location of tables 42 in relation to the table frame 44, the operating station 33 and the loading station 31 can be ascertained, and the data regarding that position fed to a computer (not shown). In one embodiment, two tables 42 are provided. Use of two tables 42 allows a welding operation to take place within the enclosed workspace 30 on a workpiece positioned on the work surface 40 and a table 42 while a second table 42 can be positioned in the loading area 31 allowing the operator to remove, reload and secure a succession of workpieces without significant interruption in the operating cycle. In this fashion, a welding operation can be taking place simultaneously with a loading or unloading operation. The presence of a curtain 18 protects the operator from the hazards associated with the welding operation taking place behind the curtain 18.

Figure 3:
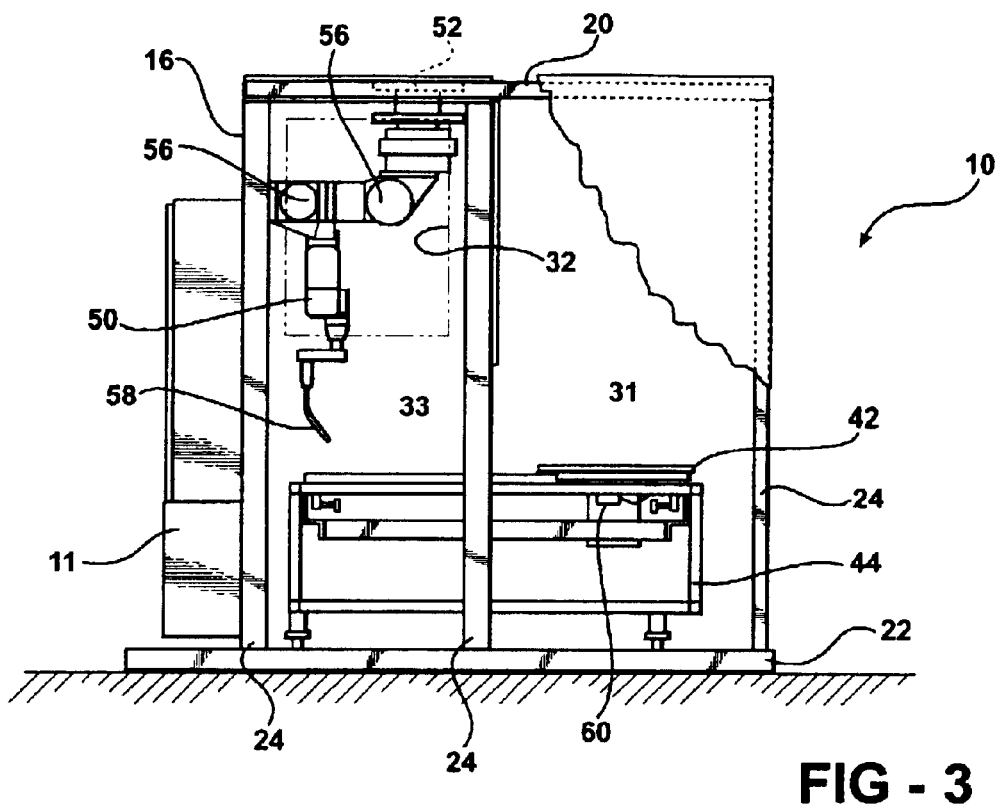
FIG. 3 is aside view of the invention.
Figure 4:
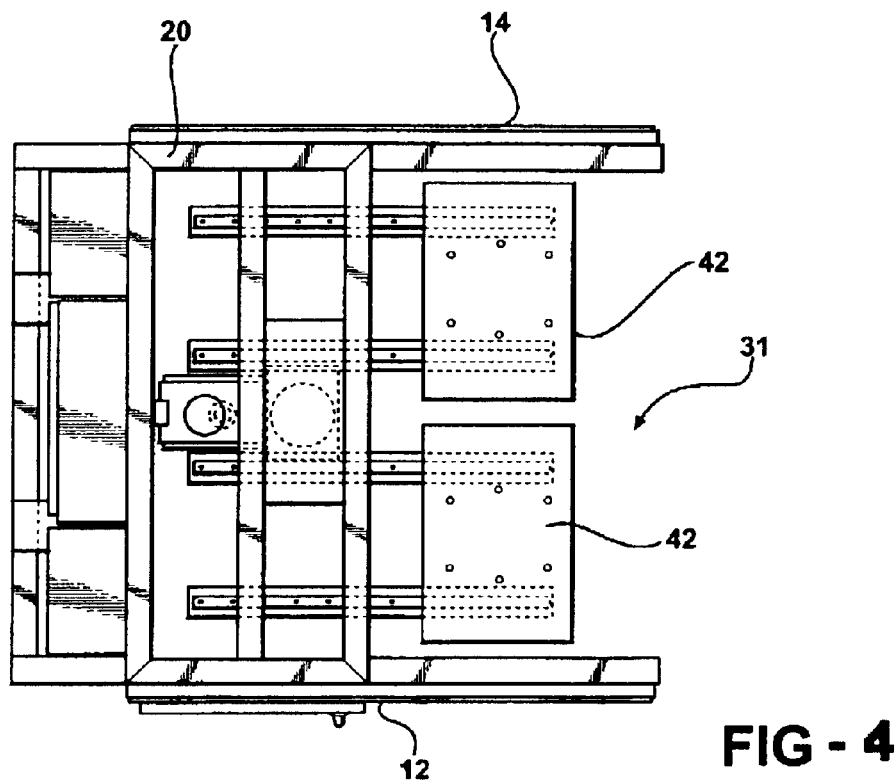
FIG. 4 is a top view of the invention embodiment with dual work tables.
Figure 7:
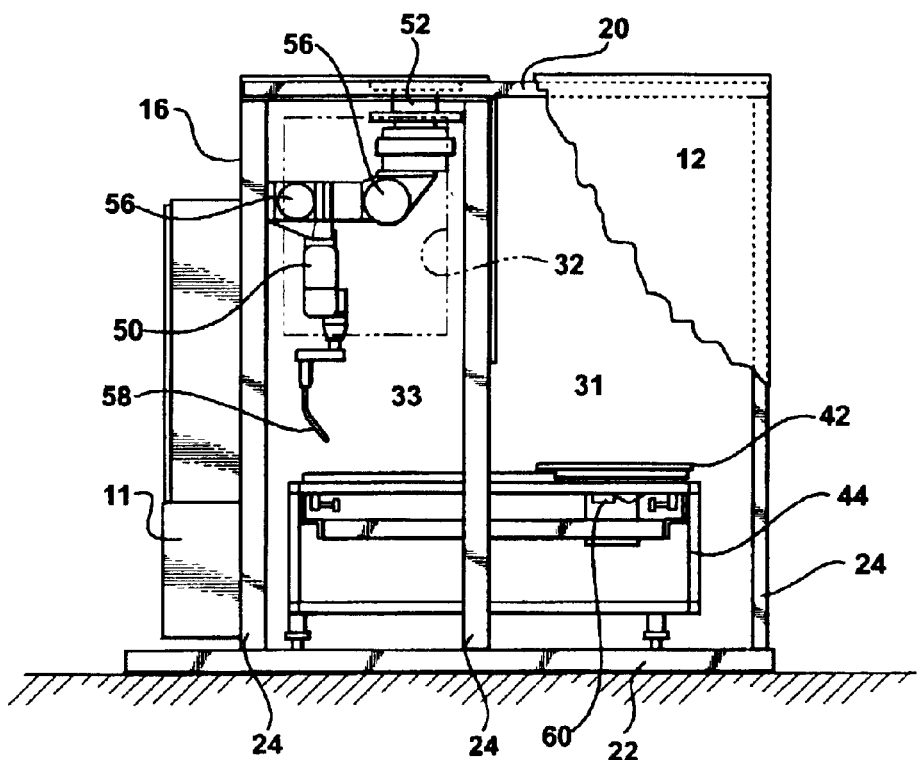
FIG. 7 is a side view of the invention embodiment with dual work tables.
Figure 8:
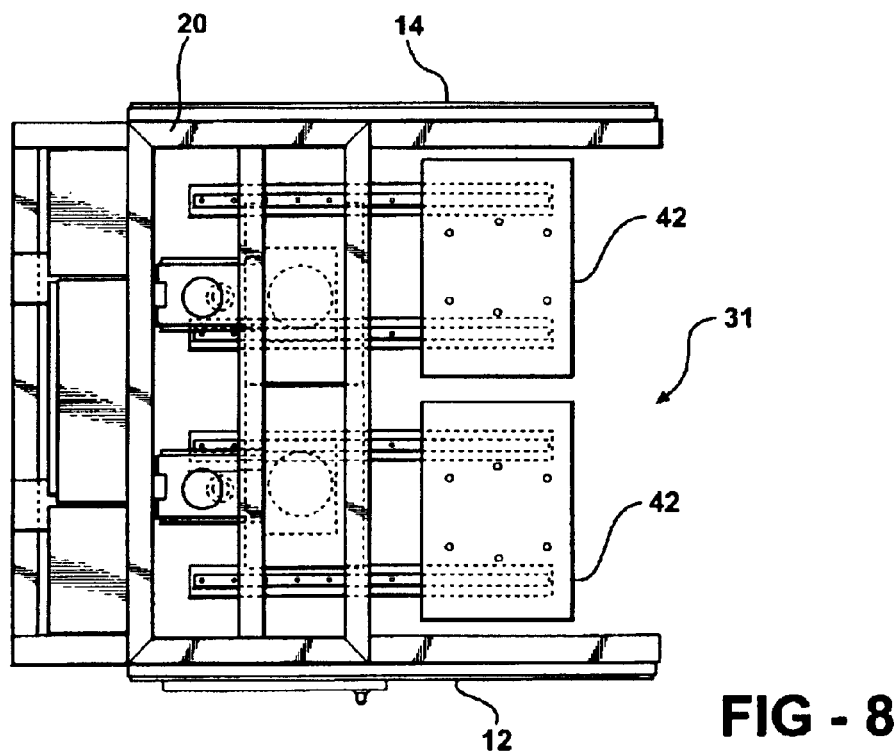
FIG. 8 is a top view of the invention embodiment with dual work tables and dual robots.

The welding operation will be better understood by reference to FIGS. 3 and 4, which show the parked position of the robot 50. In this embodiment, a robot 50 is mounted to a robot base 52. The robot base 52 is in turn mounted to the top frame 20 of the welding station 10. By positioning the robot 50 on the top frame 20, support is provided for the robot head within the welding station 10 operating station 33 without the need for a separate mounting pedestal or support adjacent to the welding station 10. Robot 50 is provided with motors (not shown), articulating joints 56 and a welding head 58. Preferably, the motors are digitally operated stepper motors having feedback means, enabling the position of each motor to be reported to the computer (not shown).

Under control from the computer (not shown) detailed instructions regarding the positioning of the welding head 58 by the motors may be accomplished. Further, the work table is preferably provided with sensors 60, also connected to the computer (not shown). Sensors 60 may be video devices, tactile sensors or magnetic sensors Additional sensors 60 may be programmable to recognize the position, surface and dimension attributes of the workpiece. Therefore, in addition to being pre-programmed to perform welding operations under the control of the computer or robot controller (not shown), the welding head may be provided with means for verifying and improving the position of welding head 58 prior to execution of any weld. In a typical application, the welding operation involves one or more welds carried out under the control of the computer (not shown). The welding head may perform a single welding operation, a continuous weld operation, or a series of welds depending on the requirements of the particular job.

A typical sequence for operation of the machine begins with the loading of the workpiece by an operator on the work surface 40 of table 42. The operator then cycles a control (not shown), which continues the sequence. The next step in the sequence is the transport by the table drive system of the table from the loading area 31 to the operating workspace 30. Because curtain 18 is flexible, movement of the table 42 and associated workpiece pushes the curtain 18 temporarily up until the table has passed into the operating position, which permits the curtain 18 to fall back under the force of gravity to a more or less vertical orientation. Next, the sensors 60 verify the presence and position of the workpiece in a vicinity of the welding head 58 of the robot 50. The robot motors 54 are then instructed to position the various articulating joints 56 of the robot 50 to position the welding head 58 adjacent to the point of the first weld. A signal is then provided to the robot welding head 58 to initiate the weld. This procedure continues for all welds required for the workpiece. Once the computer has instructed the robot 50 to complete its final weld, the computer then instructs the table 42 to move from the operating position 33 to the loading position 31 where the now welded workpiece can be removed by the operator and transferred to the next industrial processing station.

In a second embodiment of the invention as shown in FIGS. 5–8, a pair of robots 50 operate side by side, and the welding station 10 is provided with a pair of tables 42. Utilizing this scheme, one table 42 may be in the operating position 33 undergoing the welding operation by the robot 50 while the other table 42 is in the loading position 31, being either loaded or unloaded by the operator.

To insure the safety of the operator, as well as the safety of persons in the vicinity, the computer (not shown) is programmed to lock out any welding operations when any of the shutters 34 is in the opened position, or when no table 42 is in position under the welding head 58 in the operating position.

The entire welding station 10 is constructed as a transportable unit, permitting the welding station 10 to be lifted by its bottom frame 22 or top frame 20, and repositioned within the manufacturing facility. The robot 50 and its associated motors 54, and articulating joints 56 and welding head 58 are articulatable through essentially the entire interior portion of the interior portion of the enclosed workspace 30 defined as the operating position 33. The robot 50 is provided with full x, y and z axis movement by virtue of the articulating joints 56 and base 52. This insures that the robot head 58 may be positioned in relation to any exposed portion of the workpiece affixed to the work surface 40 of table 42.

The top frame 20, bottom frame 22, side frame 24 and table frame 44 are constructed from rigid frame members, typically of steel or aluminum alloys welded together in a well known fashion. A control computer, electrical connectors, transformers, and other power and control elements are enclosed within a protective enclosure 11. Top frame 20 may be provided with rails 23 and robot base 52 may be provided with rail engaging carriers (not shown) to permit the robot base 52 to move from side to side within the enclosed workspace 30 of the welding station 10. Such movement may be manually or computer-controlled.

Figure 9:
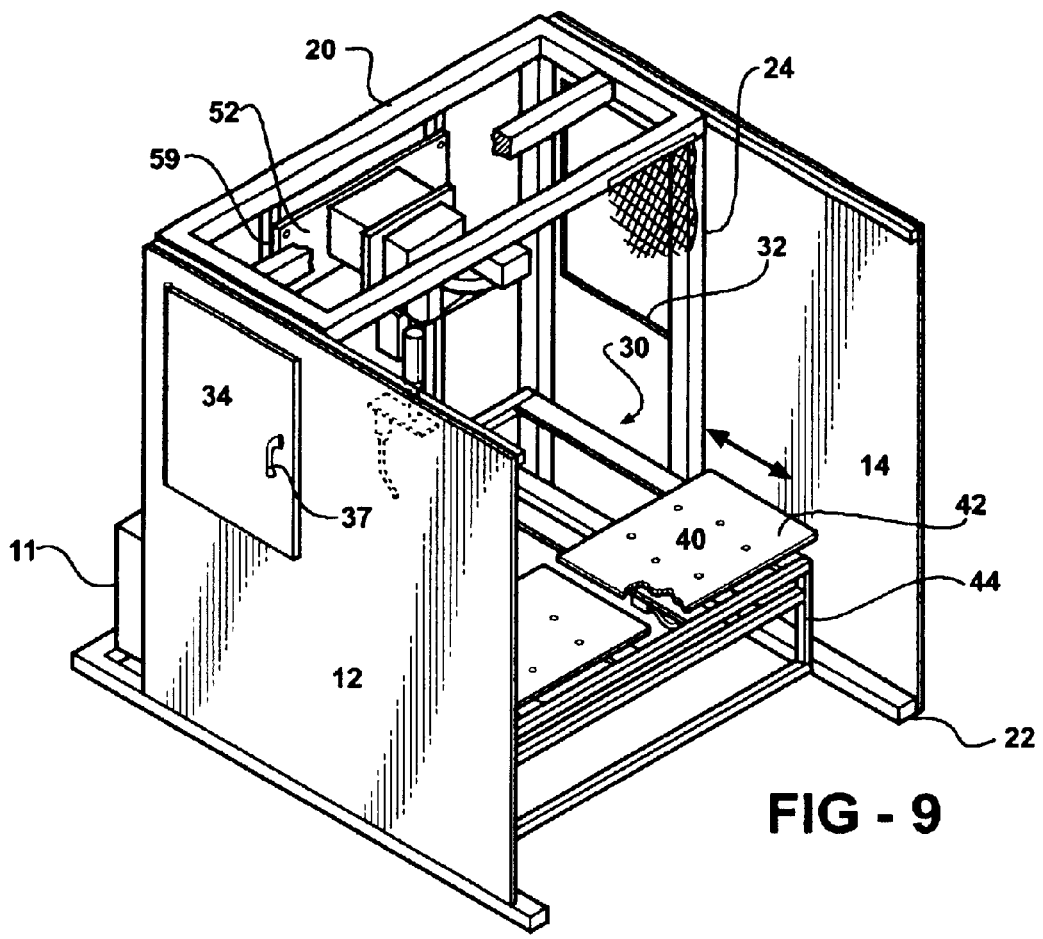
FIG. 9 is a perspective view of the invention embodiment with rear wall mounted robot.
Figure 10:
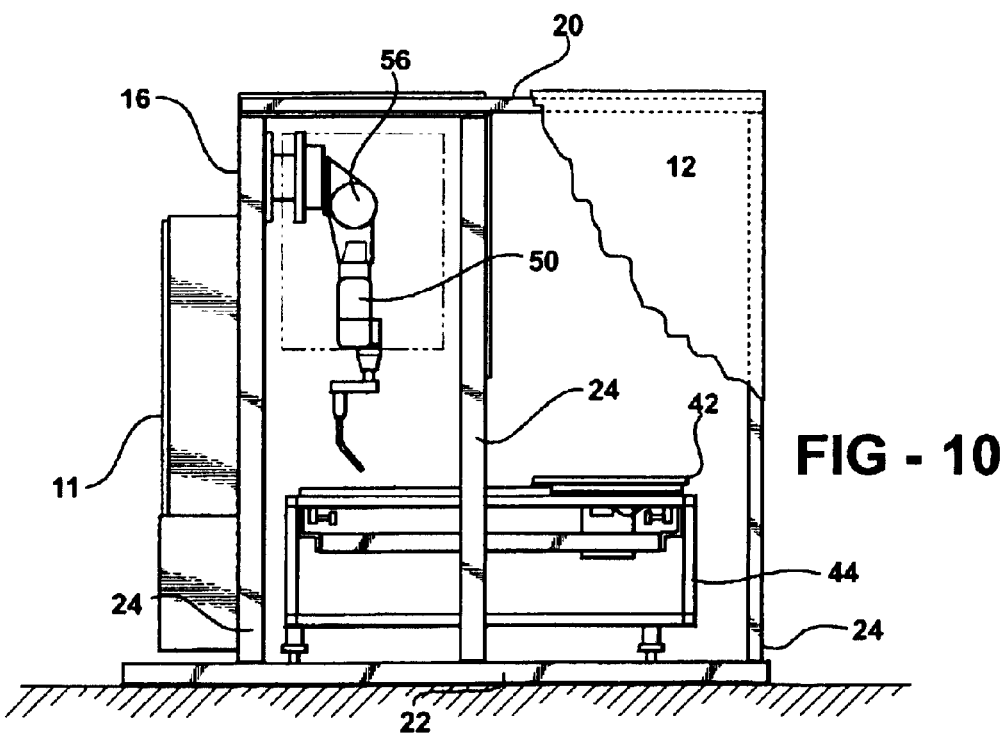
FIG. 10 is a side view of the invention embodiment with rear wall mounted robot.

In yet another embodiment of the invention as shown in FIGS. 9 and 10, one or more robots may be mounted to the side frame 24. In this embodiment, the robot base 52 may be mounted to a side frame 59 of the welding station 10.

Programing of the robotic welding operation above-disclosed is generally accomplished through the use of a teaching pendent 60 electronically connected to the computer. Utilizing this methodology, the robot may be positioned to each desired welding point on a workpiece by opening the shutters 34 and positioning a workpiece, utilizing appropriate tooling, on table 42 positioned in the operating position. The pendent 60 is equipped with controls which permit an operator to cause the robot 50 to be moved to a particular welding position. Each movement of the robot, including operation of the welding tool, is memorized by the computer as an operator manually positions the robot 50 and welding head 58 utilizing the pendent. The entire sequence of operations is stored by the computer in its memory for later recall. Upon recall, the precise movements of the robot 50 are replicated by the computer. The sequences of instruction provided by an operator utilizing the teaching pendent 60 may be memorized by the computer and stored in volatile, non-volatile or removable memory devices, such as computer disks. Once the sequence of operations for a particular welding task has been taught to the computer, the teaching pendent 60 may be disconnected or disabled, and the shutters 34 over the openings 32 are closed prior to engaging in the actual welding operation utilizing the stored sequences afore described.

What is claimed is:

1. An apparatus for welding, comprising:

a self-contained, portable enclosure defining a work space which further comprises one or more side walls, a bottom frame, a top frame and one or more side frames;

a table frame affixed to said bottom frame, said one or more side frames with or both;

at least one work surface selectively positionable on said table frame between a loading position and an operating position;

at least one robot positioned above said work surface;

at least one window disposed in at least one side wall;

at least one shutter disposed on said at least one side wall and selectively positionable to cover and uncover said at least one window;

drive means mounted within said work space for positioning said at least one robot and said at least one work surface;

sensor means mounted within said work space for determining the positions of said at least one robot and said at least one work surface;

computer means affixed to said enclosure for controlling said drive means and said sensor means; and a welding head mounted to said at least one robot.

2. The apparatus of claim 1, wherein said robot is mounted to said top frame.

3. The apparatus of claim 1, wherein said robot is mounted to one of said one or more side frames.

4. The invention of claim 1, which further comprises said at least one work surface positionable on a linear axis between a loading position and an operating position.

5. An apparatus for welding, comprising:

a self-contained, portable enclosure defining a work space which further comprises one or more side walls, a bottom frame, a top frame and one or more side frames;

a table frame affixed to said bottom frame, said one or more side frames with or both;

a pair of adjacent work surfaces selectively positionable on said table frame between a loading position and an operating position;

at least one robot positioned above said work surface;

at least one window disposed in at least one side wall;

at least one shutter disposed on said at least one side wall and selectively positionable to cover and uncover said at least one window;

drive means mounted within said work space for positioning said at least one robot and said at least one work surface;

sensor means mounted within said work space for determining the positions of said at least one robot and said at least one work surface;

computer means affixed to said enclosure for controlling said drive means and said sensor means; and a welding head mounted to said at least one robot.

6. The invention of claim 5, wherein each of said pair of selectively positionable work surfaces is positionable on a linear axis between a loading position and an operating position.

* * * * *

UNITED STATES PATENT AND TRADEMARK OFFICE
CERTIFICATE OF CORRECTION

PATENT NO. : 6,772,932 B1
DATED : August 10, 2004
INVENTOR(S) : Halstead

It is certified that error appears in the above-identified patent and that said Letters Patent is hereby corrected as shown below:

Column 2,
Line 6, after the word "like", please insert -- . --;
Line 41, please delete "aside", and insert -- a side --;

Column 4,
Line 19, after the word "sensors", please insert -- . --;

Column 5,
Line 7, delete "of the interior portion";

Column 6,
Line 2, delete "frames with or", and insert -- frames, or --;
Line 32, delete "frames with or", and insert -- frames, or --.

Signed and Sealed this

Twenty-first Day of December, 2004

JON W. DUDAS
*Director of the United States Patent and Trademark Office*